United States Patent [19]

Elvingsson

[11] Patent Number: 5,083,499
[45] Date of Patent: Jan. 28, 1992

[54] IMPACT MOTOR WITH IMPROVED SEALING OF A DRIVE PISTON

[75] Inventor: Bengt A. P. Elvingsson, Kalmar, Sweden

[73] Assignee: Berema Aktiebolag, Solna, Sweden

[21] Appl. No.: 604,767

[22] Filed: Oct. 26, 1990

[30] Foreign Application Priority Data

Oct. 28, 1989 [SE] Sweden .................................. 8903623

[51] Int. Cl.⁵ ........................... F16J 1/06; F16J 9/06; F16J 15/00; F02F 5/00
[52] U.S. Cl. ........................................ 92/193; 92/172; 277/165; 277/198; 384/37; 173/102; 173/114
[58] Field of Search ................. 92/192, 172, 193, 194, 92/248, 168 R; 277/165, 198; 173/101, 103, 114, 121, 102; 384/31, 32, 37

[56] References Cited

U.S. PATENT DOCUMENTS

| | | | |
|---|---|---|---|
| 2,369,926 | 2/1945 | Thornhill et al. | 384/37 |
| 2,607,644 | 8/1952 | Smith et al. | 277/165 |
| 3,046,062 | 7/1962 | Wettstein | 92/168 |
| 3,269,466 | 8/1966 | Mitchell | 173/103 |
| 4,749,201 | 6/1988 | Hunger | 277/165 |
| 4,749,202 | 6/1988 | Bonomi | 277/165 |
| 4,928,577 | 5/1990 | Stoll | 92/192 |

FOREIGN PATENT DOCUMENTS

| | | | |
|---|---|---|---|
| 249662 | 11/1964 | Australia | 277/165 |
| 613114 | 1/1961 | Canada | 277/165 |
| 2436969 | 2/1975 | Fed. Rep. of Germany | 277/165 |
| 1101256 | 10/1955 | France | 277/165 |
| 556813 | 6/1955 | Italy | 277/165 |
| 1083933 | 9/1967 | United Kingdom | 277/165 |

Primary Examiner—Edward K. Look
Assistant Examiner—Thomas Denion
Attorney, Agent, or Firm—Eric Y. Munson; Mark P. Stone

[57] ABSTRACT

An impact motor comprises a housing (10) with a cylinder (11) therein, in which a reciprocating drive piston (40) via a gas cushion in a working chamber (44) of said cylinder (11) repeatedly drives a hammer piston (15) to impact on and to return from the neck (17) of a tool (20) carried by the machine housing (10). A piston groove (68) is provided adjacent to the front face (70) of the drive piston (40) and the peripheral part of said face (70) is rounded (71) towards said groove (68). A piston ring (41) is of steel having a temperature expansion coefficient substantially equal to the cylinder's (11) and is ground circumferentially to have a close sliding and sealing fit in the cylinder (11). The rounded (71) drive piston face (70) is adapted to the inner diameter of said ring (41) so as to permit the ring (41) to be forced into said groove (68) undeformed to ride on a elastically centering O-ring (69) of heat resistant rubber. The hammer piston (15) can alternatively have a similarly arranged steel or heat resistant plastics material piston ring (16) therearound or be machined to a sliding and sealing fit in the cylinder (11).

9 Claims, 1 Drawing Sheet

IMPACT MOTOR WITH IMPROVED SEALING OF A DRIVE PISTON

SUMMARY OF THE INVENTION

The present invention relates to impact motors of the type comprising a housing with a cylinder therein, in which a reciprocating drive piston via a gas cushion in a working chamber of said cylinder repeatedly drives a hammer piston to impact on and to return from the neck of a tool carried by the machine housing.

The above type of impact motors is common in usually hand held hammer machines powered by electric, hydraulic or combustion motors, and used for example for chiselling and drilling. The motor transmits its rotation to a crank mechanism, in which a connecting rod is journalled to the drive piston causing it to reciprocate and alternately to compress and to evacuate the gas cushion in the working chamber, whereby the hammer piston by gas spring action is caused to advance onto respectively to recede from the tool.

For sealing cooperation with the cylinder wall the drive piston is provided with piston rings. Metallic springy i.e. slit piston rings of the type common in compressors always leak to some extent through the slit. Such piston rings, if applied in the present context on gas spring driven impact motors, in combination with leakage due to wear, are liable to cause piston collision and resultant machine breakdown. Furthermore the springiness of such rings is known to produce wear marks and edges in the cylinder wall at the level in which the drive piston is under top load, i.e. when changing direction at its lower turning point. The hammer piston head in its reciprocation thereupon traverses these wall deficiencies and, if being provided with a plastics material piston ring, is subjected to hard piston ring wear ending by undesirable leakage or ring destruction. In a recent alternative intended for low power impact motors, the gas compressing drive piston has been provided with an undivided graphite alloyed piston ring of plastics material. These rings have a temperature expansion coefficient differing from the one of the cylinder, and that demands some compensation for continued proper functioning of the ring at full power. Machine breakdown due to overheating is to be feared in such context, particularly in impact motors built for heavy duty applications.

BACKGROUND OF THE INVENTION

It is an object of the invention to provide means in the aforementioned type of impact motors applicable to more powerful hammer machines and apt to improve the cooperation between the drive and hammer pistons thanks to better sealing of the drive piston, elimination of the formation of ring wear marks at the piston turning point in the cylinder, and a reduction of ring wear under operation. These objects are attained by the characterizing features of the appended claims.

BRIEF DESCRIPTION OF THE DRAWINGS

The invention is described in more detail with reference to the accompanying drawings.

Therein

DESCRIPTION OF THE PREFERRED EMBODIMENTS OF THE INVENTION

Figure 1:
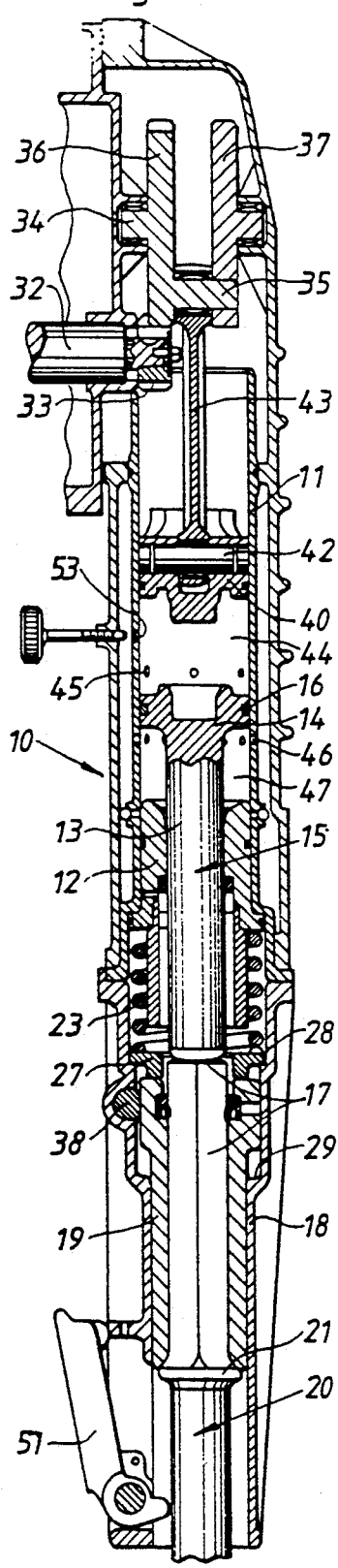
FIG. 1 shows a longitudinal partial section through a hammer machine embodying the invention.
Figure 2:
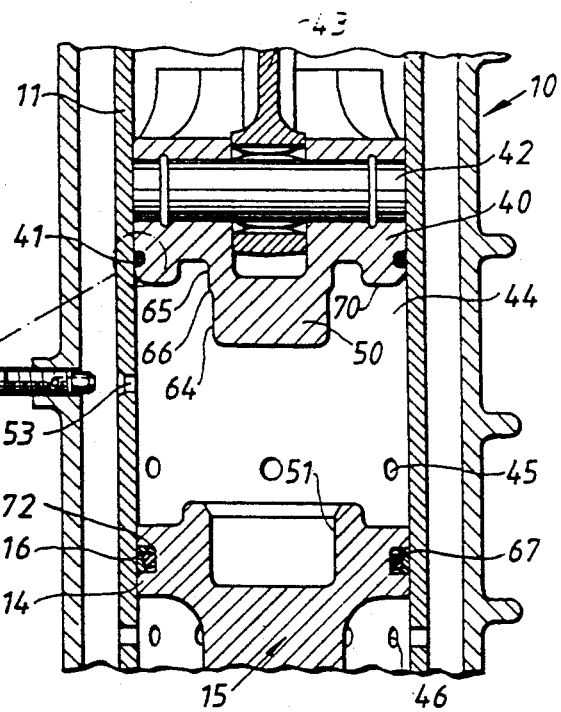
FIG. 2 shows an enlarged sectional view of the impact motor part in FIG. 1.
Figure 3:
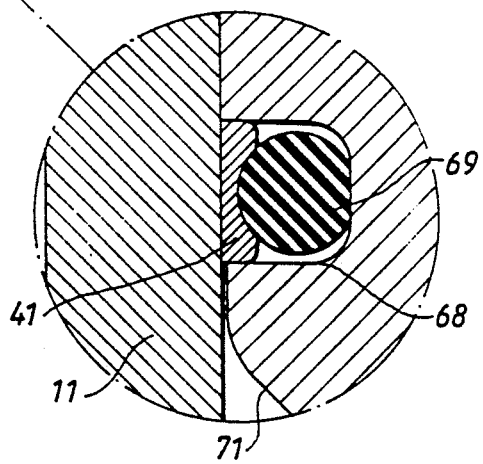
FIG. 3 is a fragmentary view enlarged from FIG. 2 of the drive piston and its sealing ring.

The hammer machine in FIG. 1 comprises a hand held machine housing 10 with a cylinder 11, in which a hammer piston 15 is slidably guided and sealed by a piston ring 16 surrounding the piston head 14. A hammer piston rod 13 passes slidably and sealingly through the cylinder bottom end 12 and delivers impacts against the neck 17 of a tool 20, for example a pick for heavy breaking or drill, which by a collar 21 is applied axially against a tool sleeve 19 and is slidably retractable therefrom. The sleeve 19 in its turn is axially slidably guided in the frontal end 18 of housing 10 and, when the work so demands, is prevented from rotating by slidable contact of a plane surface thereon with a flattened cross pin 38 in the end 18. In the working position of FIG. 2 the sleeve 19 abuts against a spacing ring 27. A helical recoil spring 23 is pre-stressed between the bottom end 12 and the spacing ring 27, urging the latter onto an inner shoulder 28 in the frontal end 18. The pre-compression of spring 23 is such as to balance the weight of the machine when the latter is kept standing on the tool 20 as depicted in FIG. 1 or at least to provide a distinct resistance to beginning spring compression in such position. When the machine is lifted from said position, the tool sleeve 19 will sink down to inactive position against an abutment shoulder 29 in the frontal end 18, while the sinking movement of the tool 20 continues and is stopped by the collar 21 being arrested by a stop lever 57. Simultaneously therewith the hammer piston 15 sinks down taking its inactive position in the foremost part 47 of the cylinder 11.

The housing 10 comprises a motor, not shown, which drives a shaft 32, and a gear wheel 33 thereon is geared to rotate a crank shaft 34 journalled in the upper part of the machine housing 10. The crank pin 35 of the crank shaft 34 is supported by circular end pieces 36,37 of which one is formed as a gear wheel 36 driven by the gear wheel 33. In the impact motor part of housing 10, the drive piston 40 is slidably guided in cylinder 11 and sealed thereagainst by a piston ring 41. A piston pin 42 in the drive piston 40 is pivotally coupled to the crank pin 35 via a connecting rod 43. Between the drive piston 40 and the hammer piston head 14 the cylinder 11 forms a working chamber 44 in which a gas cushion transmits the the movement of the drive piston 40 to the hammer piston 15 by way of air spring impulses.

In order to center the drive piston 40 in and to improve its sealing and heat transmitting capacity to the cylinder 11, the piston ring 41 is an undivided steel ring ground at its outside to sealing slidable fit closely against the cylinder wall without spring action outwardly thereagainst and with a temperature expansion coefficient substantially equal to the cylinder's. The piston ring 41 is inserted in a peripheral annular groove 68 adjacent to the front face 70 of drive piston 40 and, since the ring 41 is undivided, the peripheral edge 71 of face 70 is to such an extent formed rounded and adapted to the inner diameter of the ring, that the ring, by being applied in inclined position, can be forced into the ring groove 68 with substantially no stress producing expansion. The inside of steel ring 41 is hollowed out and rides on an O-ring of heat resistant rubber, which elastically and sealingly fills up the clearance between the ring 41 and the bottom of groove 68, thereby also centering he drive piston 40 in the cylinder 11.

The hammer piston head 14 has an annular peripheral groove 72 carrying the piston ring 16, in a preferred embodiment an undivided one of wear resistant plastic material such as glass fiber reinforced PTFE(polytetrafluorethene), which seals slidably against the wall of the cylinder 11 in front of the drive piston 40. The piston ring 16 is sealed against the piston head 14 by an O-ring of preferably heat resistant rubber (Viton-rubber), which sealingly fills the gap therebetween and centers piston head 14. The ring 16 is slightly expanded elastically and forced over the head 14 into the groove 72 to cover the ring 16. As an alternative, the piston head 14 may have a piston ring 16 of steel similar to drive piston ring 41 and combined with proper means on the hammer piston head 14 to enable forcing the metallic ring into its ring groove 72 in analogy with what was described above in connection with drive piston groove 68. The above steel rings 41,16 are to be mounted in their grooves 68,72 substantially with no play in axial direction. In a further alternative the hammer piston head 14 can be machined to have a sealing and sliding fit in the cylinder 11, in which case the piston ring 16 and groove 27 are omitted.

The interior of the machine is suitably connected to the ambient air. The working chamber 44 communicates with the interior of the machine through the wall of cylinder 11 via primary ports 45, secondary ports 46, and a control opening 53 provided therebetween in the cylinder wall. The total ventilating area of opening 53 and primary ports 45 and the distance of the latter to the piston ring 16 are calculated and chosen such that the hammer piston 15 in its idle position, FIG. 1, is maintained at rest without delivering blows while the overlying gas volume is ventilated freely through the ports and opening 45,53 during reciprocation of the drive piston 40 irrespective of its frequency and the rotational speed of the motor.

When starting to work, the operator, with the motor running or off, directs by suitable handles, not shown, the machine to contact the point of attack on the working surface by the tool 20 whereby the housing 10 slides forwardly and spacing ring 27 of the recoil spring 23 abuts on the tool sleeve 19, FIG. 1. The operator selects or starts the motor to run at a suitable rotational speed and then applies an appropriate feeding force on the machine. As a result the recoil spring 23 is compressed further, the hammer piston head 14 is displaced towards the primary ports 45, and the ventilating conditions in the working chamber 44 are altered so as to create a vacuum that to begin with will suck up the hammer piston 15 at retraction of the drive piston 40. The suction simultaneously causes a complementary gas portion to enter the working chamber 44 through the control opening 53 so that a gas cushion under appropriate overpressure during the following advance of the drive piston 40 will be able to accelerate the hammer piston 15 to pound on the tool neck 17. The resultant rebound of the hammer piston 15 during normal work after each impact then will contribute to assure its return from the tool 20. Therefore, the percussive mode of operation will go on even if the feeding force is reduced and the machine again takes the FIG. 1 position on the tool 20. The control opening 53 is so calibrated and disposed in relation to the lower turning point of the drive piston 40 and to the primary ports 45, that the gas stream into and out of the control opening 53 in pace with the movements of the drive piston 40 maintains in the working chamber 44 the desired correct size of and shifting between the levels of overpressure and vacuum so as to assure correct repetitive delivery of impacts. The secondary ports 46 ventilate and equalize the pressure in the volume below the piston head so that the hammer piston 15 can move without hindrance when delivering blows. It should be observed that at impacting the hammer piston ring 16 during repetitive impacts of the hammer piston 15 on the neck 17 will always be disposed in intermediate position between the ports 45,46 and never in alignment with them.

In order to switch from impacting to the idle hammer piston position in FIG. 1 with the drive piston 40 reciprocating and the hammer piston 15 immobile, it is necessary for the operator to raise the hammer machine a short distance from the tool 20 so that the neck 17 momentarily is lowered relative to the hammer piston 15 causing the latter to perform an empty blow without recoil. As a result the hammer piston 15 will take the inactive position in chamber 47, the secondary ports 46 will ventilate the upper side of the hammer piston 15 and impacting ceases despite the continuing work of the drive piston 40. Such mode of operation is maintained even upon the machine being returned to the balanced position thereof in FIG. 1 with the hammer piston head 14 returned to idle position between the ports 45,46.

The drive piston 40 carries centrally thereon an axially protruding damping piston 50 of reduced diameter which, when the pistons meet, is caught pneumatically in an outwardly closed damping cylinder 51 centrally on the hammer piston 15. The mantle of the damping piston 50 has at least two diametrical steps 64,65 thereon separated by a small frusto-conical transition 66 acting as a guiding surface at penetration of damping piston 50 into cylinder 51. An outer longer step 64 has a play relative to the cylinder 51, for example closely to 1 mm, which at initial catching enables a gentle gasfrictional braking under gas escape through the interjacent clearance out into the working chamber 44. Such braking will often enough be sufficient to revert piston movement. Another shorter diametrical step 65 innermost at the damping piston root with a substantially sealing fit or play relative to the cylinder 51, for example up to 0.1 mm, will at extreme recoil finally prevent piston collision by gas trapped in the damping cylinder 51. The inner 64 or both diametrical steps 64,65 can be given a better sealing effect by being coated with paint containing PTFE of the type used for sealing the rotors of screw compressors. Constructionally it will readily be understood that further steps with stepwise reduced clearance to the cylinder 51 may be provided intermediate the steps 64,65 and that damping piston and cylinder 50,51 in case of need may be arranged in a mutually changed position.

The metallic piston ring 41 of the drive piston 40 is closely ground to correct tolerance in order together with O-ring 69 to seal and center the drive piston 40 in the cylinder 11. As a result the gas leakage past the piston is reduced markedly in comparison with earlier solutions and the power transmission via the gas spring in working chamber 44, which depends on the pressure levels attainable therein, will thus operate with greater safety and be easier to calculate constructionally. Substantially contributive thereto are also the improved sealing alternatives for the hammer piston 15. Observable during work is the smoothing influence of the steel piston ring 41 on the swept-over cylinder surface whereby the friction in the impact motor is reduced and the drive and hammer piston efficiency is increased. It is believed that the improved piston centering together with the improvements in the piston rings has suppressed the formation of undesirable turning point marks in the cylinder wall. The centering also promotes efficient cooperation the damping elements 50,51 in their collision preventing task.

The impact motor according to the invention is not restricted to the exemplified type of hammer machines but can be advantageously applied in other types of such machines utilizing a similar air spring drive principle.

I claim:

1. An impact motor comprising a housing; a cylinder in said housing; a tool supported in said housing at a first end of said cylinder; a drive piston reciprocably movable within said cylinder at a second end of said cylinder; a hammer piston reciprocably movable in said cylinder between said drive piston and said tool; a working chamber defined in said cylinder between a front face of said drive piston and said hammer piston; porting means defined in said cylinder adapted to communicate with said working chamber during reciprocal movement of said drive and hammer pistons so as to alternately produce a gas cushion in said working chamber active to drive said hammer piston to impact on said tool during movement of said drive piston towards said tool, and to provide reduced pressure in said working chamber to cause said hammer piston to recede from said tool during movement of said drive piston away from said tool; an annular piston groove defined on said drive piston; an elastic sealing ring of heat resistant rubber mounted in said piston groove, and a piston ring thinner than said sealing ring and sealingly riding thereon in said groove; said piston ring being provided by an undivided rigid annulus of rectangular cross-section and steel having a temperature expansion coefficient substantially equal to that of the cylinder, and being machined to form its outside to a peripherally stable sealing and sliding surface closely fitted against said cylinder.

2. An impact motor according to claim 1, wherein said peripherally stable surface of said piston ring is machined by grinding said annulus.

3. An impact motor according to claim 1, wherein the axial width of said steel annulus exceeds the cross section of said rubber ring, and said annulus is mounted with free radial inward play in said piston groove so as to enable compression of said rubber ring therein.

4. An impact motor according to claim 3, wherein said piston groove is defined adjacent to one end face of said drive piston, the peripheral edge portion of said end face being rounded towards said groove and adapted to cooperate with the inner diameter of said annulus so as to permit the piston ring, in an inclined position, to be forced around said peripheral edge portion into said groove substantially without expansive strain.

5. An impact motor according to claim 4, wherein said rubber ring is formed as an O-ring, and the inside of said steel annulus of said piston ring is hollowed out to ride over said peripheral edge portion and on to said rubber ring.

6. An impact motor according to claim 1, wherein said hammer piston is elastically centered to reciprocate in said cylinder by an undivided metallic piston ring substantially similar to the piston ring mounted on said drive piston and machined to have a close sliding fit in said cylinder, said hammer piston ring being disposed in an annular piston groove defined in said hammer piston and centered elastically thereagainst by a further sealing formed from heat resistant rubber.

7. An impact motor according to claim 1, wherein said hammer piston is sealed to reciprocate in said cylinder by an undivided piston ring of heat resistant plastic material having a sliding fit in said cylinder, said hammer piston ring being disposed in an annular piston groove defined in said hammer piston and centered elastically thereagainst by a sealing O-ring formed from heat resistant rubber.

8. An impact motor according to claim 1, wherein said hammer piston is machined to have a sliding, centering, and sealing fit in said cylinder.

9. An impact motor according to claim 7, wherein said hammer piston ring is positioned relative to said porting means defined in said cylinder such that at repetitive impacts of said hammer piston on the neck of said tool, said hammer piston ring is not in alignment with said porting means in said cylinder.

* * * * *